(12) United States Patent
Olson (10) Patent No.: US 8,402,861 B2
(45) Date of Patent: Mar. 26, 2013

(54) ADJUSTABLE RISER ASSEMBLY

(75) Inventor: Jesse W. Olson, Thief River Falls, MN (US)

(73) Assignee: Arctic Cat Inc., Thief River Falls, MN (US)

( * ) Notice: Subject to any disclaimer, the term of this patent is extended or adjusted under 35 U.S.C. 154(b) by 1135 days.

(21) Appl. No.: 11/680,454

(22) Filed: Feb. 28, 2007

(65) Prior Publication Data

US 2008/0202280 A1   Aug. 28, 2008

(51) Int. Cl.
*B62K 21/00* (2006.01)
*B62K 21/12* (2006.01)
*B62K 21/16* (2006.01)

(52) U.S. Cl. ....... 74/551.3; 74/551.1; 280/276; 280/279

(58) Field of Classification Search ...... 74/551.1–551.8; 280/276, 279; 403/322.4; 404/322.4; *B62K 21/16, B62K 21/12*
See application file for complete search history.

(56) References Cited

U.S. PATENT DOCUMENTS

| | | | |
|---|---|---|---|
| 4,059,171 A | 11/1977 | Pakosh | |
| 4,688,817 A | 8/1987 | Marier | |
| 5,207,289 A | 5/1993 | Wilmo | |
| 5,323,664 A | 6/1994 | Fairfield et al. | |
| 5,331,865 A * | 7/1994 | Oskam | 74/551.3 |
| 5,458,213 A | 10/1995 | Nakaya et al. | |
| 5,476,020 A | 12/1995 | Garvey et al. | |
| 6,176,503 B1 | 1/2001 | George | |
| 6,276,291 B1 | 8/2001 | Lapointe et al. | |
| 6,578,652 B1 | 6/2003 | Kobacker, II et al. | |
| 6,920,806 B2 * | 7/2005 | Cutsforth | 74/551.8 |
| 6,988,740 B2 * | 1/2006 | Bobrovniczky | 280/276 |
| 7,353,731 B2 * | 4/2008 | Lin | 74/551.7 |
| 7,685,904 B2 * | 3/2010 | Cutsforth | 74/551.3 |
| 2004/0016316 A1 | 1/2004 | Bechler | |
| 2004/0245744 A1 | 12/2004 | Emang et al. | |
| 2005/0115754 A1 | 6/2005 | Watson et al. | |
| 2005/0194199 A1 | 9/2005 | Marks et al. | |
| 2005/0247156 A1 | 11/2005 | Vaisanen | |
| 2006/0099027 A1 * | 5/2006 | Liao | 403/322.4 |
| 2007/0034435 A1 | 2/2007 | Berg et al. | |
| 2007/0186716 A1 * | 8/2007 | Chen | 74/551.3 |

FOREIGN PATENT DOCUMENTS

| | | | |
|---|---|---|---|
| DE | 42 24 374 A1 | * | 1/1993 |
| EP | 0 736 447 A1 | * | 10/1996 |
| WO | WO 03/033335 A1 | * | 4/2003 |

OTHER PUBLICATIONS

English Abstract of DE 4224 374 A1.*

* cited by examiner

*Primary Examiner* — Vinh Luong
(74) *Attorney, Agent, or Firm* — Lowe Graham Jones PLLC (57) ABSTRACT

A vehicle, such as a snowmobile, includes a handlebar assembly for steering the vehicle. The handlebar assembly includes a riser pivotally secured to a steering shaft and handlebars pivotally secured to the riser. A clamp selectively engages both handlebars and steering shaft to fix the position of the riser relative to the handlebars and steering shaft. The clamp includes upper and lower clamps selectively drawn toward one another by a locking member embodied as a cam-lock including a rod having a cam eccentrically and pivotally connected to one end and an enlargement secured to the opposite end. A lever pivots the cam to shorten or lengthen the distance between a lower surface of the cam and the enlargement.

11 Claims, 7 Drawing Sheets

ADJUSTABLE RISER ASSEMBLY

FIELD OF THE INVENTION

This invention relates generally to snowmobiles and more specifically to steering systems for snowmobiles.

BACKGROUND OF THE INVENTION

Snowmobiles are manufactured in only a limited range of sizes and configurations, in contrast with the sizes of riders who enjoy riding snowmobiles. Riders will often use a snowmobile differently at different times. However, typical snowmobiles are designed for riders having a limited range of sizes and for a designated purpose. Typical snowmobiles are dedicated to purposes such as racing, long distance touring, mountain riding, and the like.

Such snowmobiles do not accommodate a variety of users and riding styles. Some attempts have been made to provide adjustable handlebars to accommodate riders of different sizes. However, the range of motion of many of these systems is limited to adjusting the length of a tube or pivoting a steering tube to which the handlebars secure. Such systems do not permit the user to adjust the angle of the handlebars in order to compensate for the change in orientation of the handlebars caused by the adjustment. Some systems allow greater adjustability but such systems have multiple points of adjustment with multiple fastening means, requiring the user to adjust one portion of the steering system and secure it, then adjust and secure another portion, then asses the suitability of the orientation, and then repeat the process until a suitable configuration is found.

It would therefore be an advancement in the art to provide a system allowing a user to readily adjust the position and orientation of handlebars and conveniently secure the handlebars in a desired orientation and height.

SUMMARY OF THE INVENTION

A vehicle, such as a snowmobile, includes a handlebar assembly for steering the vehicle. The handlebar assembly includes a riser pivotally secured to a steering shaft and handlebars pivotally secured to the riser. A clamp selectively engages both handlebars and steering shaft to fix the position of the riser relative to the handlebars and steering shaft.

The clamp includes upper and lower clamps selectively drawn toward one another by a locking member. The upper and lower clamps are preferably pivotally secured to the riser. In one embodiment, the locking member is a cam-lock including a rod having a cam eccentrically and pivotally connected to one end and an enlargement secured to the opposite end. A lever secures to the cam. The cam engages one of the upper and lower clamps and the enlargement engages the other of the upper and lower clamps. Pivoting of the lever causes the cam to shorten or lengthen the distance between a lower surface of the cam and the enlargement, thereby locking or releasing the upper and lower clamps. To prevent accidental release, a releasable latch secures the lever to the rod when the clamps are in a locked position. A spring engaging the riser and the lower clamp, biases the lower clamp away from the riser.

BRIEF DESCRIPTION OF THE DRAWINGS

Preferred and alternative embodiments of the present invention are described in detail below with reference to the following drawings.

DETAILED DESCRIPTION OF THE PREFERRED EMBODIMENT

Figure 1:
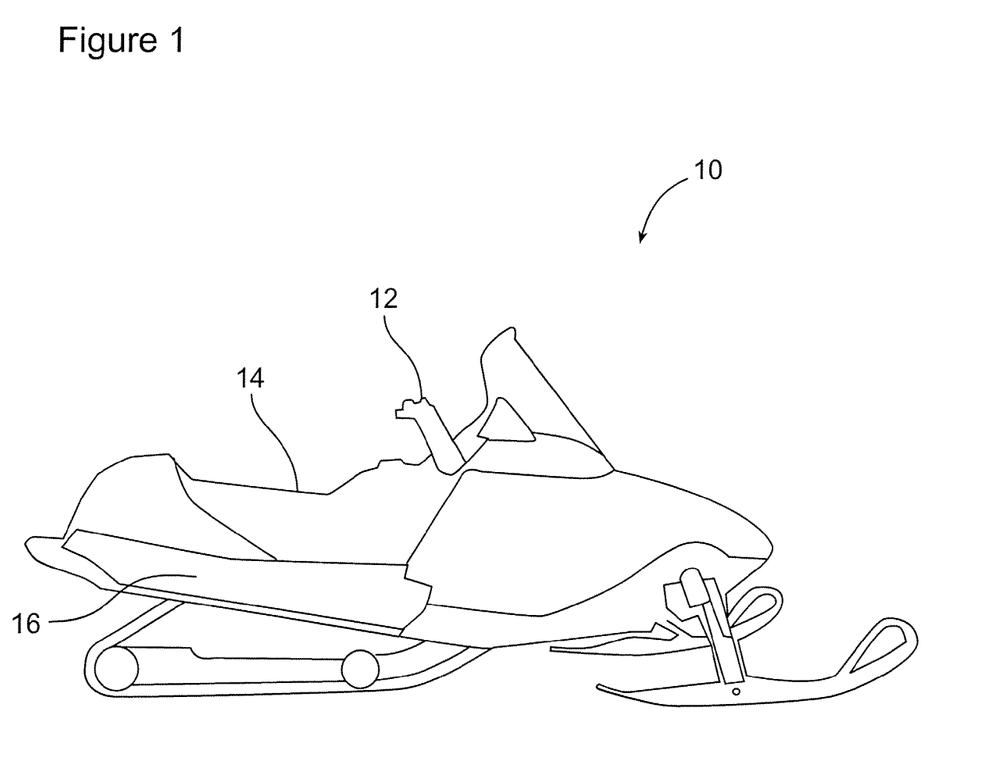
FIG. 1 is isometric view of a snowmobile.

Referring to FIG. 1, a snowmobile 10 typically includes handlebars 12 mounted at the forward end of a seat 14 mounted to a tunnel 16 housing an endless track drive system. A driver wishing to travel large distances comfortably will typically prefer to have the handlebars positioned such that the user may sit upright with the legs bent at a comfortable angle and the arms slightly bent. On the other hand, a driver wishing to drive aggressively may sit close to the handle bars in a crouched position with the body forward and the arms bent sharply in order to shift the center of gravity of the combined snowmobile and driver toward the dimensional center of the snowmobile to improve handling. The mountain rider may stand frequently with more upright hand forward handlebars.

In each of these riding styles, the wrist and hands of the user will be at a different angle relative to the handlebars. In a similar fashion, the hands and wrists of riders having different heights will also be at different angles relative to the handlebars. Accordingly, the controls should also be positioned to be comfortably actuated by users of different heights and having different riding positions.

Figure 2:
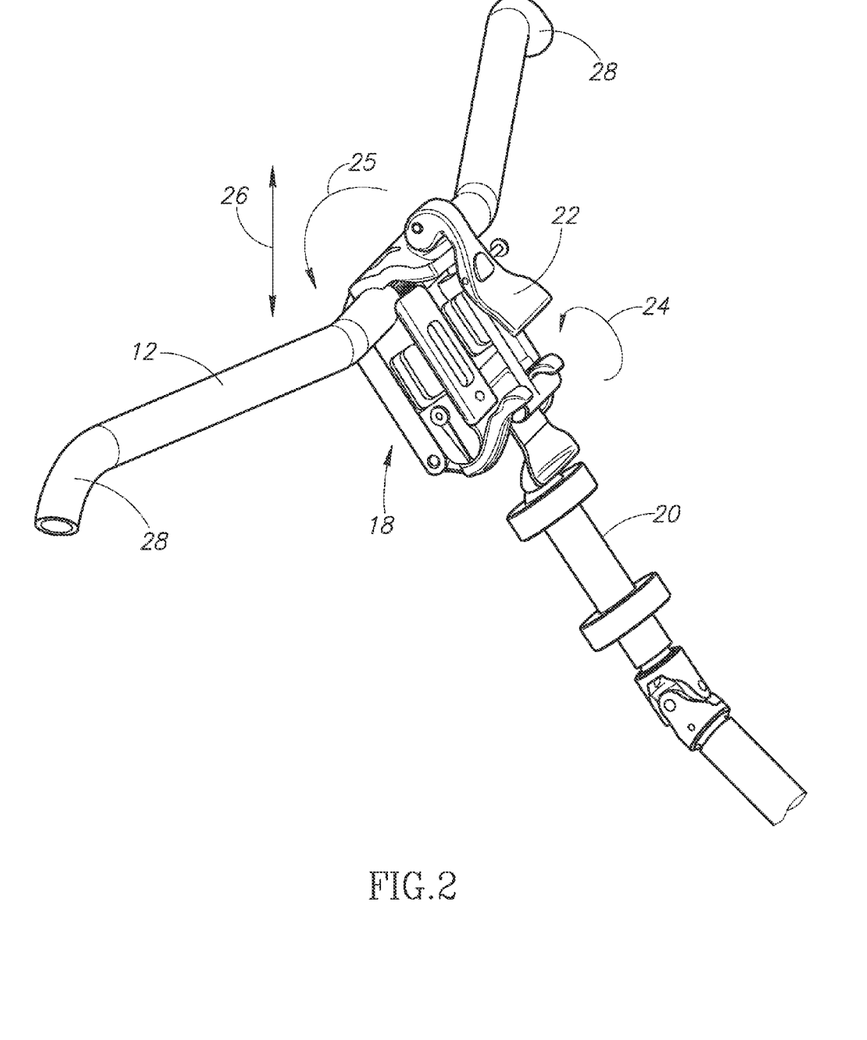
FIG. 2 is a isometric view of a steering system having an adjustable riser assembly, in accordance with an embodiment of the present invention.

Referring to FIG. 2, in one embodiment of the present invention, a riser assembly 18 secures the handlebars 12 to a steering post 20. The riser assembly 18 includes a lever 22 operated by a user to release or secure both the handlebars 12 and the steering post 20. When released and in a disengaged state, the handlebars 12 and riser assembly 18 are permitted to rotate in rotational direction 24 to permit a second rotational adjustment about a second axis. Accordingly, the handlebars 12 are pivotable up and down to accomplish and adjustment in the vertical direction 26. As the riser 18 is pivoted to adjust the general height of the handlebars 12, the handlebars 12 may be rotated in a rotational direction 25 to permit a first rotational adjustment about a first axis and to maintain the proper orientation of the handlebars and the various controls attached thereto and to accomplish further height adjustment at the ends 28 of the angled handlebars 12.

Figure 3:
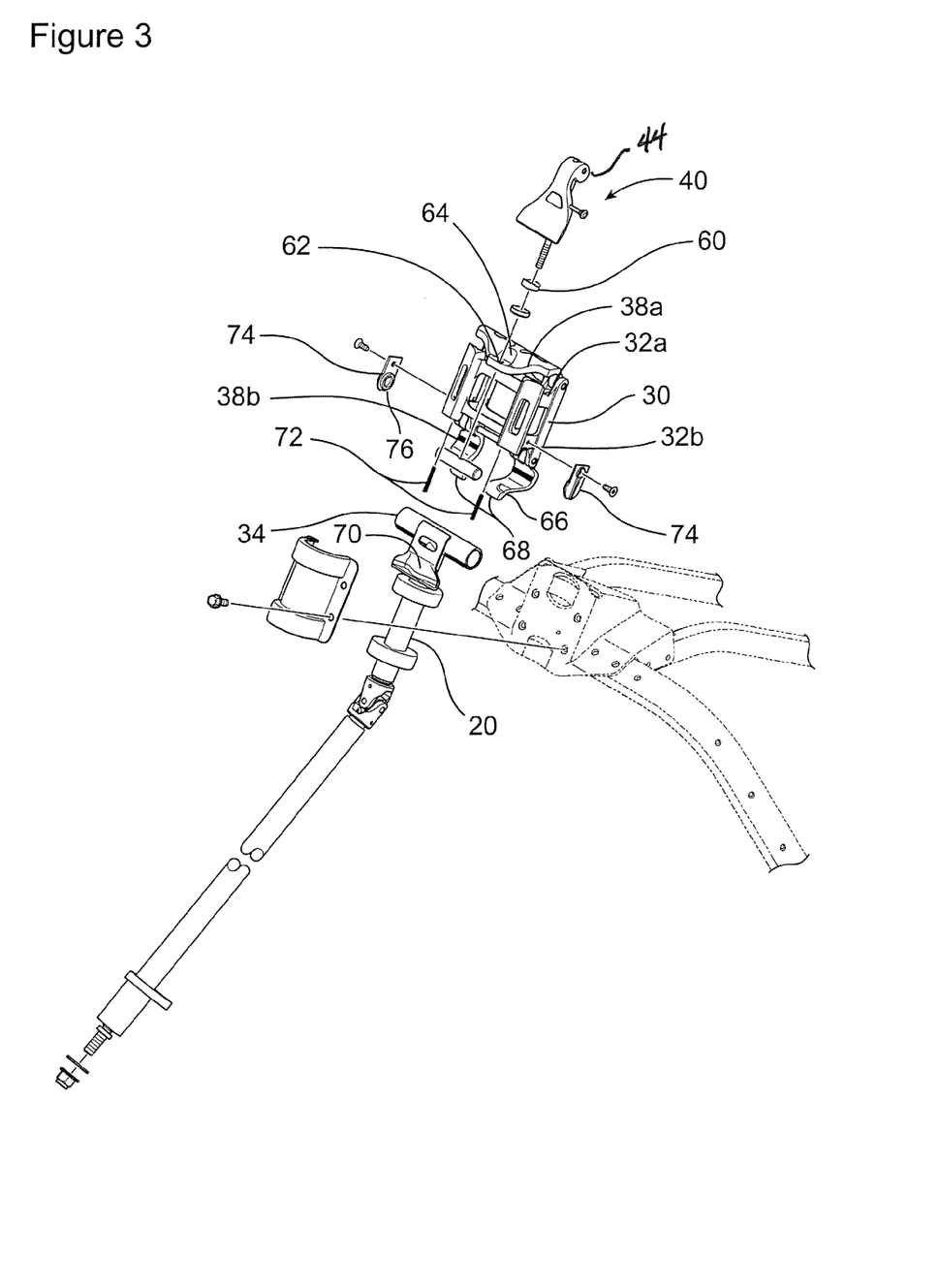
FIG. 3 is an exploded view of a steering system having an adjustable riser assembly, in accordance with an embodiment of the present invention.

Referring to FIGS. 2 and 3, in one embodiment, the riser assembly 18 includes a frame 30 having seats 32a, 32b formed therein, or secured thereto, at its upper and lower ends. The upper seat 32a receives a central portion of the handlebars 12 and the lower seat 32b receives a steering post tube 34 secured to the steering post 20. Upper and lower clamps 38a, 38b are positionable over the seats 32a, 32b to capture the handlebars 12 and steering post tube 34, respectively between the frame 30 and the clamps 38a, 38b. In the illustrated embodiment, the clamps 38a, 38b are pivotally secured to the frame 30.

Figure 4:
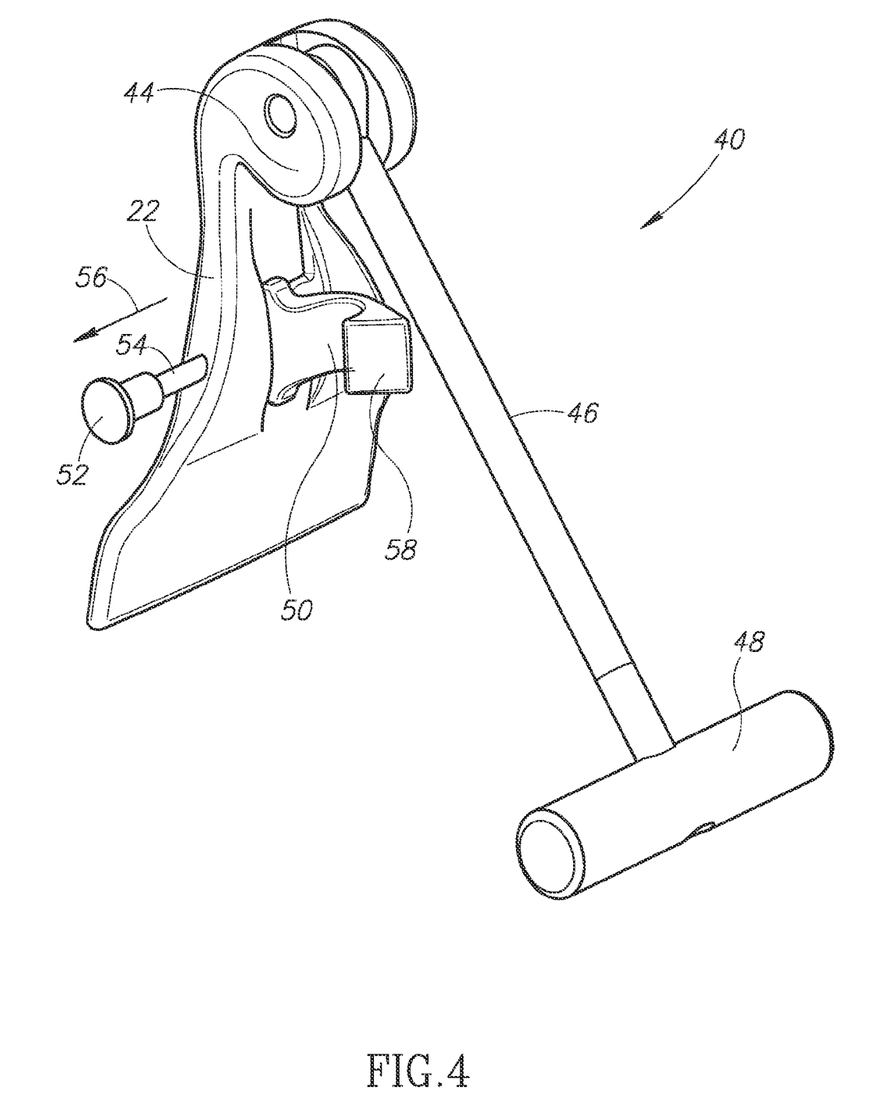
FIG. 4 is a isometric view of a cam-lock suitable for use in the adjustable riser assembly, in accordance with an embodiment of the present invention.

Referring to FIG. 4, while still referring to FIG. 3, a lock 40 pulls the clamps 38a, 38b toward the frame 30 to fix the position of the frame 30 relative to the handlebars 12 and steering post tube 34. In the illustrated embodiment, the lock 40 is a cam-lock device having a lever 22 actuating an over-center cam 44. The lever 22 and cam 44 are pivotally mounted to a rod 46 having an enlarged portion, such as a cross bar 48 secured to the end opposite the lever 22. In some embodiments, a latch 50 is provided to maintain the lever in a locked position when the riser assembly 18 is not being adjusted. A button 52 secured to a rod 54 is pushed by a user to disengage the latch 50 from the rod 46 to allow the lever 22 to be actuated to release the clamps 38a, 38b. A spring may engage the latch 50 and lever 22 to bias the latch 50 in direction 56 toward engagement with the rod 46. The latch 50 has an angled or rounded surface 58 positioned such that the latch 50 will be deflected when pressed against the rod 46, such that the latch 50 automatically latches to the rod 46 when pressed thereagainst.

Referring again to FIG. 3, the cam 44 engages a seat 60 positioned over an aperture 62 formed in the upper or lower clamp 38a, 38b. The seat 60 typically includes a wear resistant or low friction material facilitating movement of the cam 44. In the illustrated embodiment, the upper clamp 38a includes a recess 64 or inset portion 64 shaped to receive the cam 44 or seat 60.

The other of the upper and lower clamps 38a, 38b includes a seat 66 shaped to receive the cross bar 48, or other enlargement, secured to the rod 46. In the illustrated embodiment, the lower clamp 38b includes two flanges 68 each having a concave lower surface sized to receive the cross bar 48. The gap between the flanges 68 is typically sufficiently large to allow the rod 46 and a mount 70 of the steering post tube 34 to pass therethrough.

A biasing mechanism, such as one or more springs 72, bias one or both of the top and bottom clamps 38a, 38b away from the frame 30. In the illustrated embodiment, the springs 72 engage the lower clamp 38b and are positioned near the free end of the clamp 38b such that the steering post tube 34 is positioned between the springs 72 and the hinged end of the clamp 38b.

In some embodiments, retainers 74 secure to the frame 30 and engage the steering post tube 34. The retainers 74 restrain the steering post tube 34 against lateral movement when the lower clamp 38b is released. In some embodiments, the retainers 74 may include projections 76 positioned within the ends of the steering post tube 34 or surrounding the ends of the steering post tube 34. The projections 76 provide an axis about which the steering post tube 34 may rotate, such that even when the clamp 38b is released, the tube 34 is constrained to rotation about the projections 76 rather than shifting position within the seat 32b and the clamp 38b.

Figure 5A:
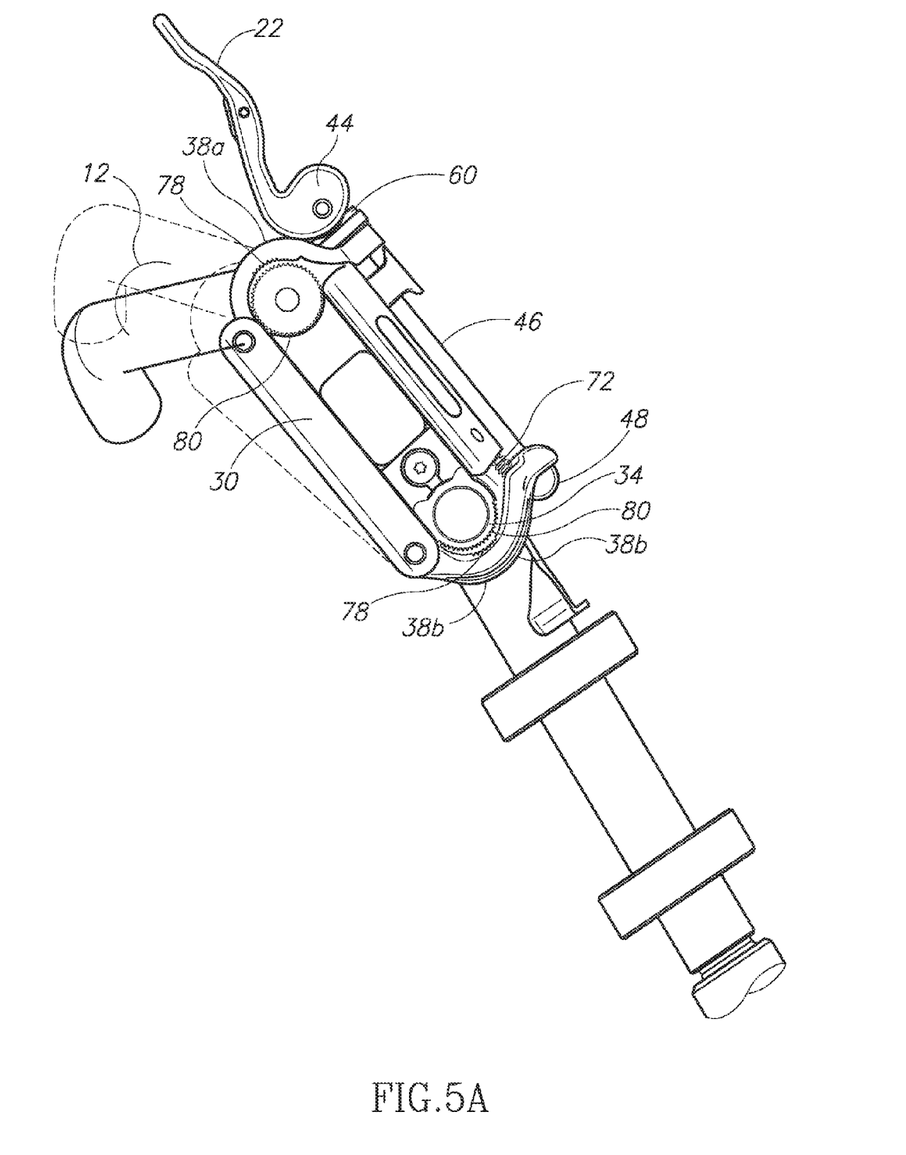
FIGS. 5A and 5B are a side views of an adjustable riser assembly in released and locked positions, in accordance with an embodiment of the present invention.
Figure 5B:
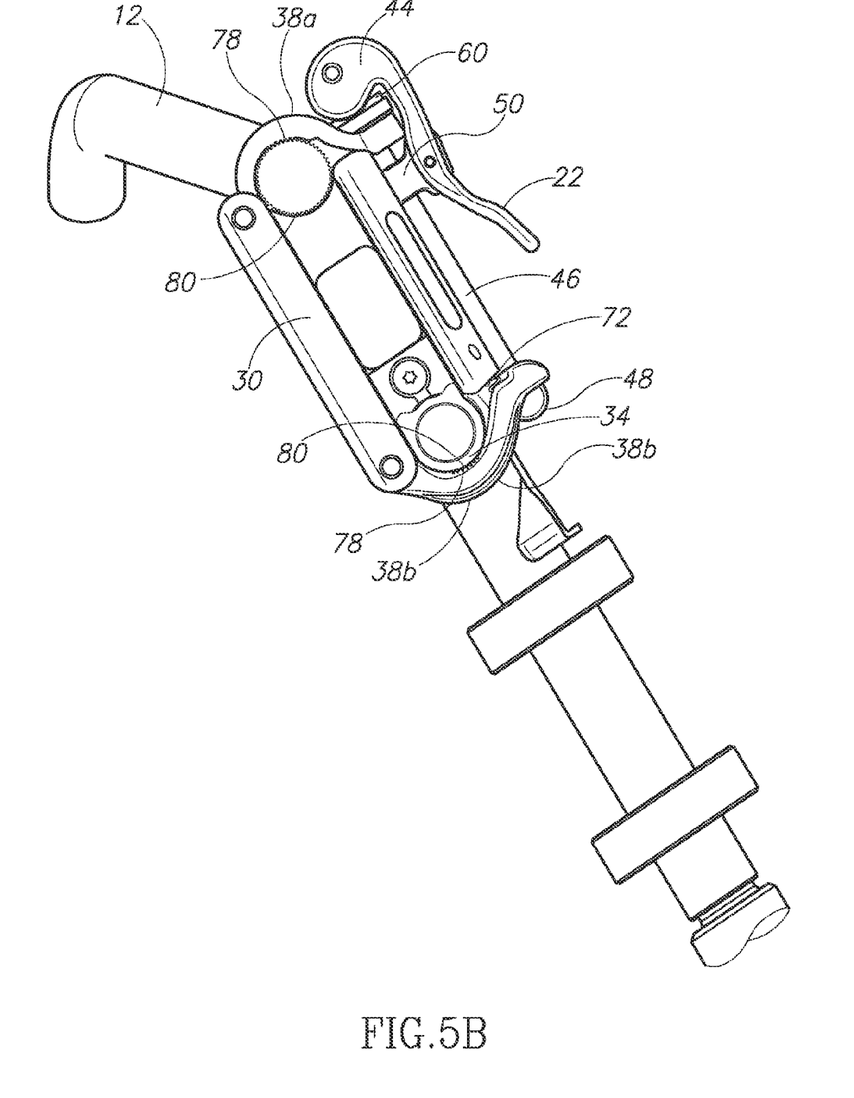

A preferable method of using the riser assembly 18 is illustrated in FIGS. 5A and 5B. In the released position of FIG. 5A, the lever 22 is pivoted away from frame 30, rotating the cam 44 such that the smaller radius portion of the cam profile is positioned over the seat 60. The springs 72 pivot the lower clamp 38b away from the frame 30. The springs 72 serve to maintain some clamping force on the upper clamp 38a through force transmitted by the rod 46. In this manner, the handlebars 12 will retain their original position unless the user applies sufficient force to overcome the force of the springs 72. Thus, a user is not required to adjust both the handlebar angle and riser angle at the same time, but may readily do so if desired. With the clamps 38a, 38b released, the frame 30 and handlebars 12 may be rotated.

Referring to FIG. 5B, in the locked position, the lever 22 is pivoted toward the frame 30, rotating the cam 44 such that a larger radius portion of the cam profile is positioned over the seat 60. The clamps 38a, 38b are pivoted toward the frame 30 because of the decreased distance between the cam 44 and the cross bar 48. In the locked position, the latch 50 is brought into engagement with the rod 46 to prevent accidental lifting of the lever 22.

In some embodiments, inner surfaces of the clamps 38a, 38b or the seats 32a, 32b include one or more projections or recesses engageable with a corresponding projection or recess on the handlebars 12 and steering shaft tube 34 to restrain the handlebars 12 and steering shaft tube 34 when the clamps 38a, 38b are drawn toward the frame 30. In the illustrated embodiment, the clamps 38a, 38b include splined or knurled areas 78 engaging corresponding splined or knurled areas 80 formed on the handlebars 12 and steering shaft tube 34.

Figure 6:
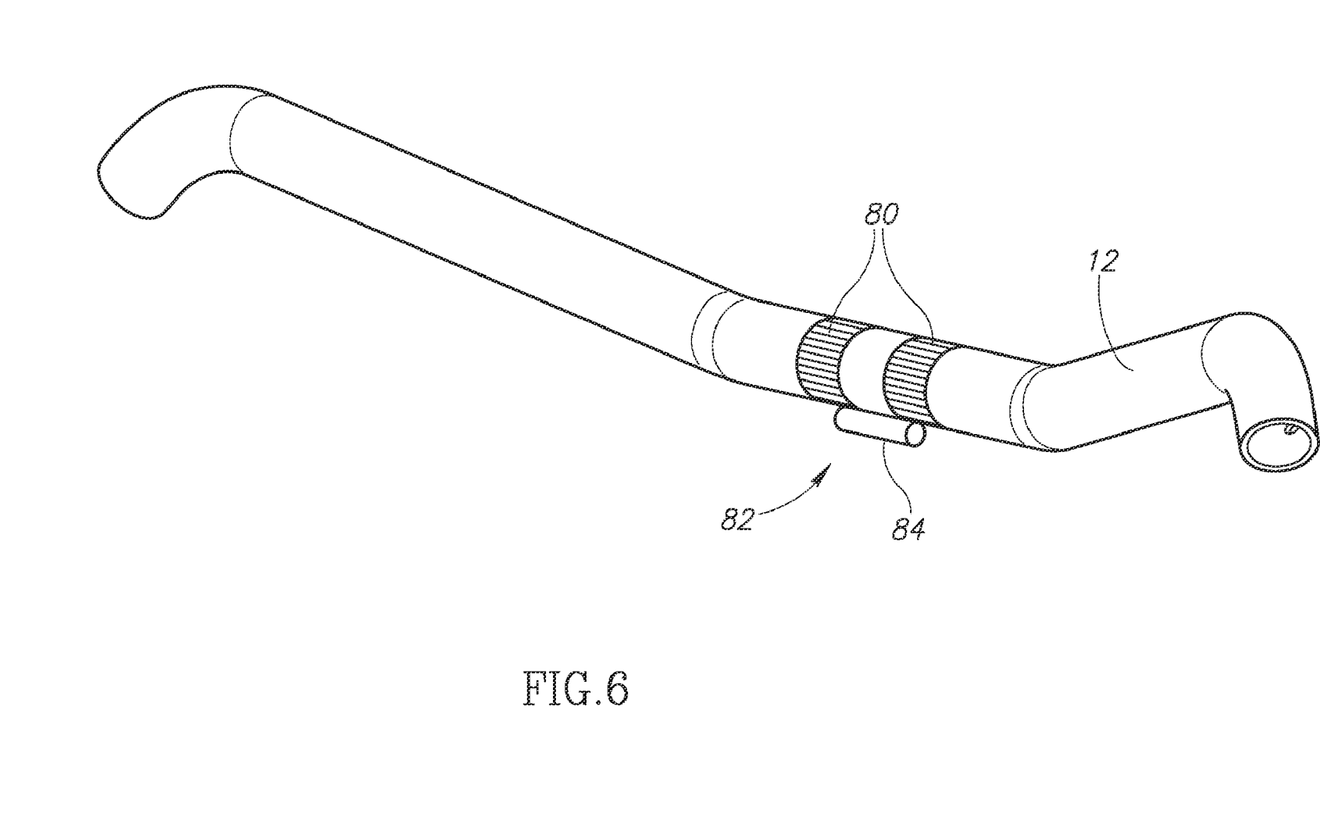
FIG. 6 is a isometric view of handlebars suitable for use in the adjustable riser assembly, in accordance with an embodiment of the present invention.

Referring to FIG. 6, while referring generally to FIG. 3, in some embodiments a stop 82 secures to either the top clamp 38a or the handlebars 12 to limit the rotation of the handlebars 12. Limiting the range of rotation of the handlebars 12 promotes safety in the event of accidental release of the lock 40. Limiting the range of motion also promotes ease of use by ensuring that the handlebars 12 will generally be positioned close to a zone of usable orientations. The stop 82 may also function to keep the handlebar 12 generally laterally centered by being captured within the frame 30, such as between the sides of the seat 32.

In the illustrated embodiment, the stop 82 is embodied as a projection 84 welded or otherwise secured to the handlebars 12. In use, the stop 82 is positioned within the frame 30. The frame 30 in the illustrated embodiment, has a generally boxed shape such that the space within the frame 30 provides room for some movement of the projection.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

The embodiments of the invention in which an exclusive property or privilege is claimed are defined as follows:

1. A handlebar assembly comprising:
   a steering post tube;
   a riser pivotally secured to the steering post tube;
   a handlebar pivotally secured to the steering post tube and the riser;
   a clamp assembly engaging the steering post tube and handlebar to fix the orientation of the riser relative to the handlebar and steering post tube, wherein the clamp assembly comprises upper and lower clamps engaging the riser, the handlebar positioned between the upper clamp and the riser and the steering post tube positioned between the lower clamp and the riser; and
   a cam-lock selectively engaging the upper and lower clamps to draw the upper and lower clamps toward one another, the cam-lock having a shaft with a first end selectively engaging one of the upper and lower clamps and a second end with a cam rotatably secured thereto, the cam selectively engaging the other of the upper and lower clamps, the cam-lock further having a lever secured to the cam; and
   a latch selectively securing the lever to a shaft.

2. The handlebar assembly of claim 1, wherein the clamp assembly pulls the handlebar and steering post tube toward the riser.

3. The handlebar assembly of claim 1 wherein the upper and lower clamps pivotally secure to the riser.

4. The handlebar assembly of claim 1 further comprising a biasing member engaging the lower clamp, the biasing member urging the lower clamp away from the riser.

5. The handlebar assembly of claim 1, wherein the upper and lower clamp each comprise an upper and lower seat, respectively, facing outwardly from the riser, the shaft further comprising projection formed thereon and selectively engaged with one of the upper and lower seat, the cam-lock engaging the other of the upper and lower seat.

6. The handlebar assembly of claim 5, wherein one of the upper and lower seats is contoured to conform to the projection and wherein the other of the upper and lower seats comprises an aperture sized to receive the shaft.

7. A vehicle comprising:
one or more knurled members;
a steering post tube engaging the one or more knurled members to control the orientation of the one or more knurled members;
a riser mounted to the steering post tube;
a handlebar mounted to the riser; and
a clamp assembly engaging the steering post tube and the handlebar, the clamp assembly configured to be in a disengaged state from the handlebar when the clamp assembly is released by a lever to allow a first rotational adjustment of the handlebar relative to the riser, the clamp assembly also configured to be in the disengaged state from the steering post tube when the clamp assembly is released by the lever to allow a second rotational adjustment of the riser relative to the steering post tube, the clamp assembly comprising:
upper and lower clamps pivotally secured to the riser, the handlebar being captured between the upper clamp and the riser and the steering post tube,
a lower spring arranged to bias the clamps outwardly away from a frame of the riser,
a cam-lock comprising a shaft having a first end selectively engaging one of the upper and lower clamps, a second end having a cam rotatably secured thereto selectively engaging the other of the upper and lower clamps, and a lever secured to the cam.

8. An assembly for use with a handlebar and steering post tube comprising:
a riser pivotally secured to the steering post tube and the handlebar;
a clamp assembly having upper and lower clamps engaging the riser, the handlebar positioned between the upper clamp and the riser and the steering post tube positioned between the lower clamp and the riser, the clamp assembly is configured in a disengaged state from the handlebar when the clamp assembly is released by a lever to allow a first rotational adjustment of the handlebar about a first axis, the clamp assembly also configured to be in the disengaged state from the steering post tube when the clamp assembly is released by the lever to allow a second rotational adjustment of the riser about a second axis, wherein the first axis is spatially separated from the second axis, whereby the upper clamp is pivotally coupled to an upper portion of the riser and the lower clamp is pivotally coupled to a lower portion of the riser; and
a cam coupled to the upper and lower clamps to draw the upper and lower clamps toward one another or away from each other, the cam having a shaft with a first end selectively engaging one of the upper and lower clamps and a second end selectively engaging the other one of the upper and lower clamps, the cam coupled to the lever that releases the upper clamp from the handlebar and the lower clamp from the steering post tube as the upper and lower clamps pivot about the riser.

9. The assembly of claim 8, wherein the lower clamp comprises two lower clamps movably coupled to the riser.

10. The assembly of claim 9, wherein the two lower clamps are spatially positioned on opposing ends of the steering post tube, and wherein the two lower clamps are configured to be in the disengaged state from the steering post tube or in the engaged state to the steering post tube, wherein the two lower clamps are spatially positioned on either side of a steering post.

11. A handlebar assembly comprising:
a steering post;
a steering post tube secured to the upper end of the steering post, the steering post tube extending transverse to the steering post;
a riser pivotally secured to the steering post tube;
a handlebar pivotally secured to the riser parallel to the steering post tube; and
a clamp assembly engaging the steering post tube and handlebar to fix the orientation of the riser relative to the handlebar and steering post tube, wherein the clamp assembly comprises upper and lower clamps engaging the riser, the handlebar positioned between the upper clamp and the riser and the steering post tube positioned between the lower clamp and the riser, and wherein the clamp assembly is in a disengaged state when the clamp assembly is released by a lever to allow a first rotational adjustment of the handlebar relative to the riser and wherein the first rotational adjustment is independent from a second rotational adjustment of the riser relative to the steering post tube, whereby the upper clamp is pivotally coupled to an upper portion of the riser and the lower clamp is pivotally coupled to a lower portion of the riser; and
a cam coupled to the upper and lower clamps to draw the upper and lower clamps toward one another or away from each other, the cam having a shaft with a first end selectively engaging one of the upper and lower clamps and a second end selectively engaging the other one of the upper and lower clamps, the cam coupled to the lever that releases the upper clamp from the handlebar and the lower clamp from the steering post tube as the upper and lower clamps pivot about the riser.

* * * * *